United States Patent [19]
Brun, Jr. et al.

[11] Patent Number: 5,631,030
[45] Date of Patent: May 20, 1997

[54] COOLED INJECTION CORE FOR AN INTEGRATED INJECTION BLOW MOLD MACHINE

[75] Inventors: Charles J. Brun, Jr., Xenia; Richard J. Schock, Miamisburg, both of Ohio

[73] Assignee: Electra Form, Inc., Vandalia, Ohio

[21] Appl. No.: 435,683

[22] Filed: May 5, 1995

[51] Int. Cl.$^6$ .......................... B29C 49/06; B29C 49/64
[52] U.S. Cl. .................. 425/526; 249/68; 249/79; 425/437; 425/438; 425/533; 425/547
[58] Field of Search .................. 425/526, 533, 425/537, 556, 547, 437, 438, 444, 575; 249/67, 68, 79, 141

[56] References Cited

U.S. PATENT DOCUMENTS

| | | | |
|---|---|---|---|
| 3,882,213 | 5/1975 | Uhlig | 425/526 X |
| 3,940,231 | 2/1976 | Uhlig | 425/526 X |
| 3,979,491 | 9/1976 | Zavasnik | 425/526 X |
| 4,005,969 | 2/1977 | Farrell | 425/533 X |
| 4,019,849 | 4/1977 | Farrell | 425/526 X |
| 4,054,629 | 10/1977 | Wang et al. | 425/533 X |
| 4,054,630 | 10/1977 | Wang | 425/533 X |
| 4,285,657 | 8/1981 | Ryder | 425/533 X |
| 4,473,515 | 9/1984 | Ryder | 425/533 X |
| 4,615,667 | 10/1986 | Roy | 425/537 X |
| 4,660,801 | 4/1987 | Schad | 425/556 X |
| 4,941,816 | 7/1990 | Aoki et al. | 425/533 |
| 5,080,574 | 1/1992 | Koga et al. | 425/526 |
| 5,242,653 | 9/1993 | Olle | 425/526 X |
| 5,253,999 | 10/1993 | Kosuge | 425/575 |

*Primary Examiner*—Richard L. Chiesa
*Attorney, Agent, or Firm*—Locke Reynolds

[57] ABSTRACT

An integrated plastic injection mold and blow mold machine includes an injection mold assembly having a cooled exterior mold assembly connected to a plastic injector for injecting plastic. A cooled core assembly is positionable within the cooled exterior mold assembly to define a mold cavity for accepting injected plastic from the plastic injector to form a parison. To allow transfer of the parison to a blow mold assembly, the cooled core assembly is movable with respect to the cooled exterior mold assembly. A thread split holds the parison and is used to first form the neck of a parison, and then move the parison from the injection mold assembly to the blow mold assembly. In addition, the parison is formed by use of a removable cooled core that is movable with respect to the thread split. The removable cooled core accommodates a poppet valve through which air can be introduced to facilitate separation of the parison from the removable cooled core while still leaving the parison held in position by the thread split. The poppet valve is cooled through direct or indirect contact with a cooling medium so that the head of the poppet valve and the plastic adjacent thereto is adequately cooled.

11 Claims, 6 Drawing Sheets

COOLED INJECTION CORE FOR AN INTEGRATED INJECTION BLOW MOLD MACHINE

FIELD OF THE INVENTION

The present invention relates to a cooled injection mold assembly for an integrated plastic injection mold and blow mold machine. More particularly, the present invention relates to a mechanism for cooling a mold core to enhance the cooling of the plastic in order to more quickly reach the temperature necessary for blow molding.

BACKGROUND OF THE INVENTION

Integrated plastic injection mold and blow mold machines are widely available for commercial use. Such machines allow manufacture of containers using injection mold techniques to form multiple parisons at a first station, and transport the parisons to a second station for blow mold processing into containers. The containers can then be moved to a third station for release from the machine to further processing. For example, machines such as disclosed in U.S. Pat. No. 4,941,816 to Aoki, U.S. Pat. No. 5,253,999 to Kosuge, or U.S. Pat. No. 5,080,574 to Koga et al., the disclosures of which are herein incorporated by reference.

However, as those skilled in the art will appreciate, an economic use of such integrated plastic injection mold and blow mold machines requires a high rate of production of formed containers. To achieve a high rate of production the residence times of plastic material at each station must be minimized, as does the time required for transfer of plastic material between stations. What is needed is an apparatus that reduces the residence time of the molded parisons in the injection station yet satisfactorily modifies the temperature of the molded parisons to that suitable for transfer to the blow mold assembly.

SUMMARY OF THE INVENTION

Accordingly, the present invention provides an integrated plastic injection mold and blow mold machine that includes an injection mold assembly having a cooled exterior mold assembly connected to a plastic injector for injecting plastic. A cooled retaining assembly is positionable within the cooled exterior mold assembly to define a mold cavity for accepting injected plastic from the plastic injector to form a parison. To allow transfer of the parison to a blow mold assembly, the cooled retaining assembly is movable with respect to the cooled exterior mold assembly. A retaining element conventionally known as a thread split holds the parison and is used to first form the neck of a parison, and then move the parison (held by its neck) from the injection mold assembly to the blow mold assembly. In addition, the parison is formed by use of a removable cooled core that is movable with respect to the thread split. The removable cooled core accommodates a poppet valve through which air can be introduced to facilitate separation of the parison from the removable cooled core while still leaving the parison held in position by the thread split.

The removable cooled core is connected to a separate water inlet and a water outlet for continuously circulating cooling water. Circulation can alternately be through an inner conduit positioned to wind about a fountain core, with the inner conduit providing a continuous fluid connection between the water inlet and the water outlet, or with a plurality of water directing elements surrounding the fountain core to impart a spiral flow pattern to water flowing between the water inlet and the water outlet. To adequately cool the plastic in the immediate vicinity of the head of the poppet valve, the poppet valve stem or rod is physically coupled to the fountain core so that the heat in the portion of the plastic forming the parison in the immediate vicinity of the introduction conduit can be conducted to the water flowing around the fountain core.

In other preferred embodiments, adequate cooling of the plastic can require secondary cooling of a valve head of the poppet valve. The poppet valve is structured to hold a poppet cooling conduit therein, with the poppet cooling conduit being connected at one end to a water inlet and connected at the other end to a water outlet to allow circulating water to cool plastic adjacent to the valve head. This structure is particularly advantageous where the diameter of the head of the poppet valve is selected to be greater than one centimeter.

Commercially available machines such as the Aoki Model SBIII-250LL-50 can be modified in accordance with the present invention. Further features and advantages of the present invention will become more apparent upon consideration of the accompanying claims, drawings, and the following description of those drawings.

DETAILED DESCRIPTION OF THE PREFERRED EMBODIMENTS

Figure 1:
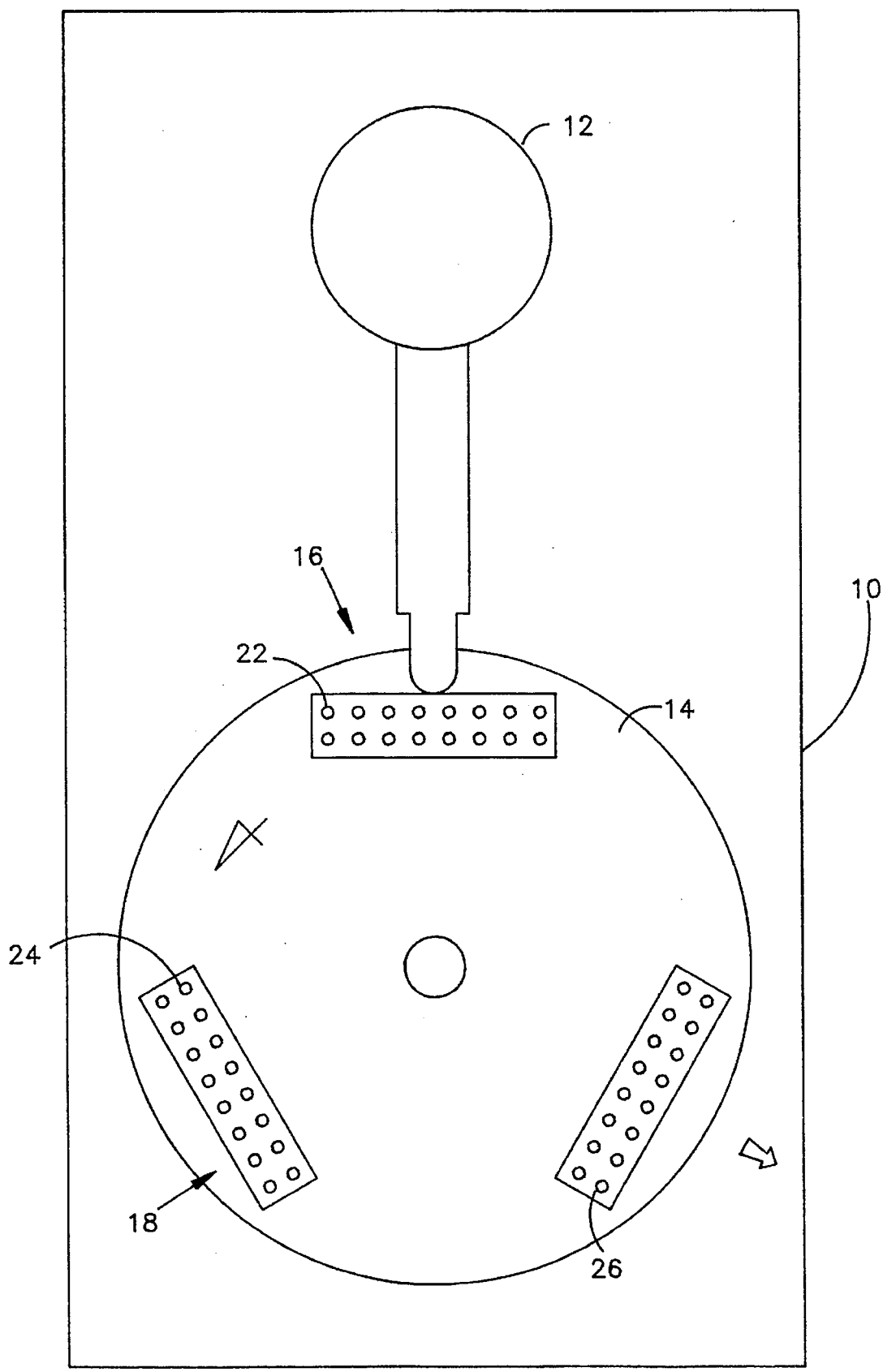
FIG. 1 is a plan view of an integrated plastic injection mold and blow mold machine, showing a cooled injection mold assembly at a first station, a blow mold assembly at a second station, and a third station for release of blow mold formed containers.

As shown in FIG. 1, an integrated plastic injection blow mold machine 10 includes a plastic injector 12 for directing molten plastic toward a first station 16. Positioned at the first station 16 are a plurality of cooled injection mold assemblies 22, with each injection mold assembly 22 being designed to form a plastic parison. Upon formation, the parisons can be transported by a revolving carriage 14 to a second station 18. At the second station 18 are located a plurality of blow mold assemblies 24 in which the parisons can be transformed into containers or other similar articles. The blow mold assemblies 24 optionally can be equipped with stretch rods that aid in expanding the parisons during the blow molding process. After transformation, the containers are cooled and then moved by revolving carriage 14 to a third station 20 where they are released as finished containers 26.

Figure 2:
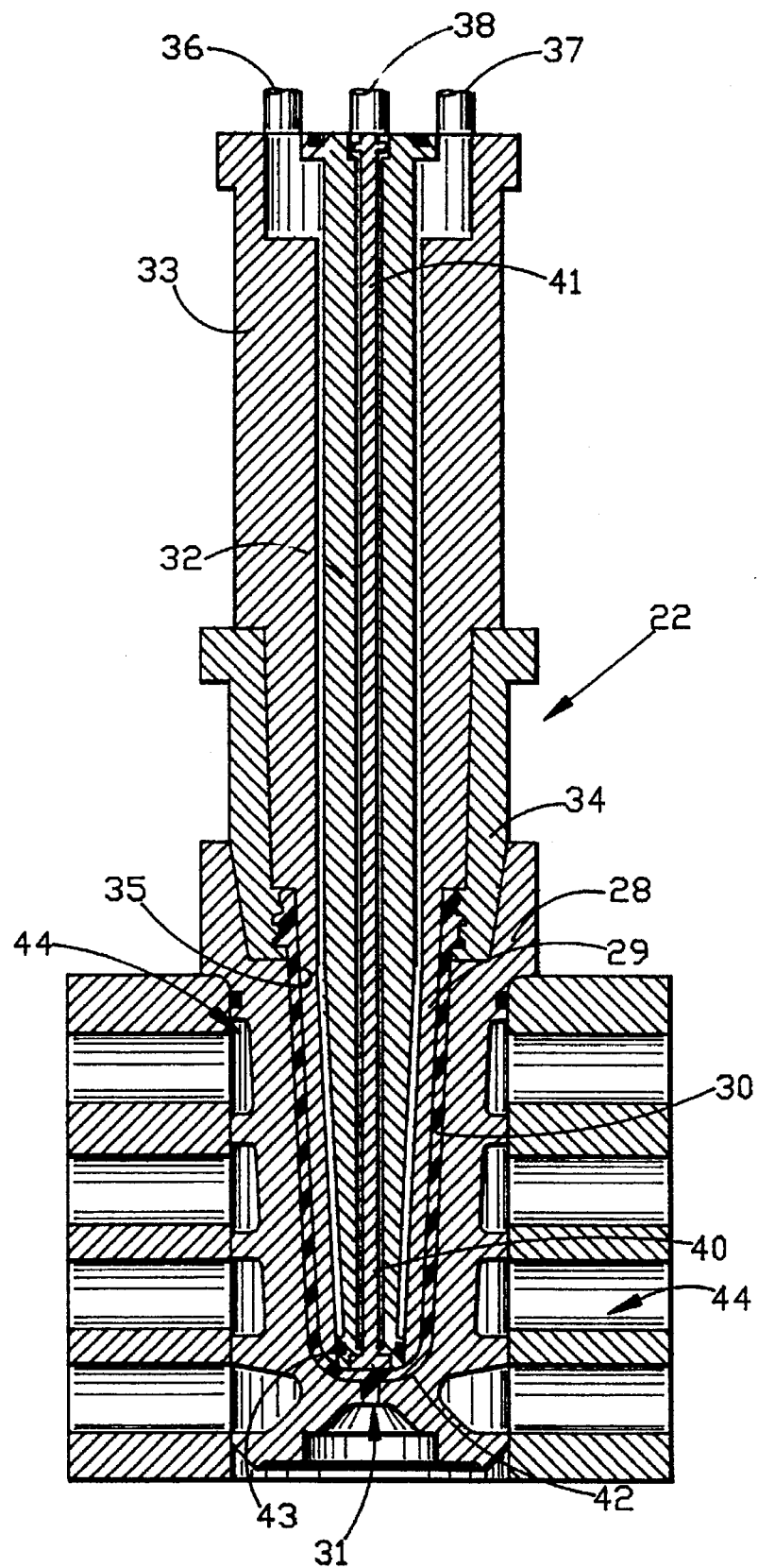
FIG. 2 is a cross sectional view of the cooled injection mold assembly for forming a parison, illustrating the cooling conduits and a thread split assembly for holding the parison.

The cooled injection mold assembly 22 is shown in FIG. 2 to include a stationary cooled exterior mold assembly 28 having mold coolant conduits 44 for cooling water and a plastic introduction conduit 31 for conveying heated plastic. The mold assembly 22 also includes thread splits 34 which define the exterior conformation of the finish portion of the parison 30. The mold assembly 22 also includes a removable cooled core 33 which contains an inner fountain core 32. Like the exterior mold assembly 28, the cooled core 33 is connected to a water inlet 36 and a water outlet 37 to permit circulation of cooling water which sluices downward between the fountain core 32 and the cooled core 33 toward the lower end of the cooled core. The water-containing space between cores 32 and 33 are sealed at the lower end by ring seal 43. A mold cavity 35 is defined on the outside by the exterior mold assembly 28 and thread splits 34, and on the inside by an exterior surface 29 of the removable cooled core 33. Plastic is introduced into the mold cavity 35 from the plastic injector 12 (shown in FIG. 1) through inlet 31 at the lower end of exterior mold assembly 28 to form parison 30.

Figure 3:
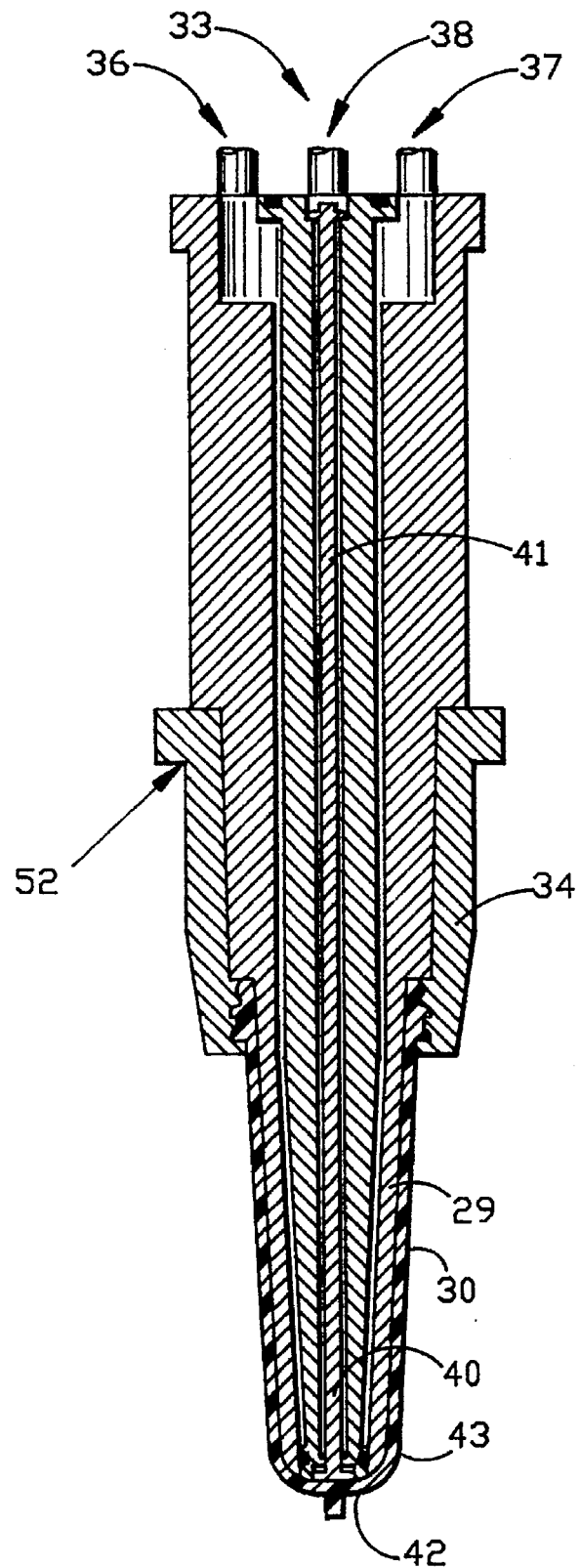
FIG. 3 is a cross sectional view of the cooled core assembly shown in FIG. 2 including a removable cooled core and thread splits as it is removed from the cooled injection mold assembly.

An air activated poppet valve 40 is shown in FIG. 3 to be centrally positioned in the removable cooled core 33. The poppet valve 40 is controlled by air introduced through air inlet 38. The poppet valve 40 has a rod 41 and valve head 42 positioned adjacent to the plastic introduction conduit 31. Due to its position relative to the plastic introduction conduit, the poppet valve rod 41 preferably is physically coupled to the fountain core 32 so that the heat in the portion of the plastic forming the parison 30 in the immediate vicinity of the introduction conduit 31 can be conducted to the water flowing between cores 32 and 33. The physical coupling between the poppet valve rod 41 and the fountain core 32 is preferably a slidable engagement so that the poppet valve 40 can allow introduction of air between the plastic parison 30 and the exterior surface 29 of the cooled core 33 to facilitate release of the parison 30 from the removable cooled core 33.

In operation, a parison 30 (as formed from heated plastic material in FIG. 2) is released from the cooled exterior mold assembly 28 for transport to the blow mold assembly 24. As seen in FIG. 3, during an initial portion of the transport, the parison 30 is held in position by the thread splits 34 gripping its neck region 52. The removable cooled core 33 remains in place during this initial stage of the transport. Then, the cooled core 33 is removed with the aid of a burst of air through the poppet valve 40. The parison is then transported into alignment with a blow mold assembly where the parison is transformed into a container in the conventional manner. Use of the cooled core 33 enhances the rate of cooling which the parison 30 experiences thus achieving the same cooled state in a shorter time. Additionally, the poppet valve 40 increases the ease of releasing the cooled core 33 from the parison 30, and allows for a substantial decrease in time required for release but can present a problem related to cooling the plastic between the poppet valve 40 and the inlet 31.

Figure 4:
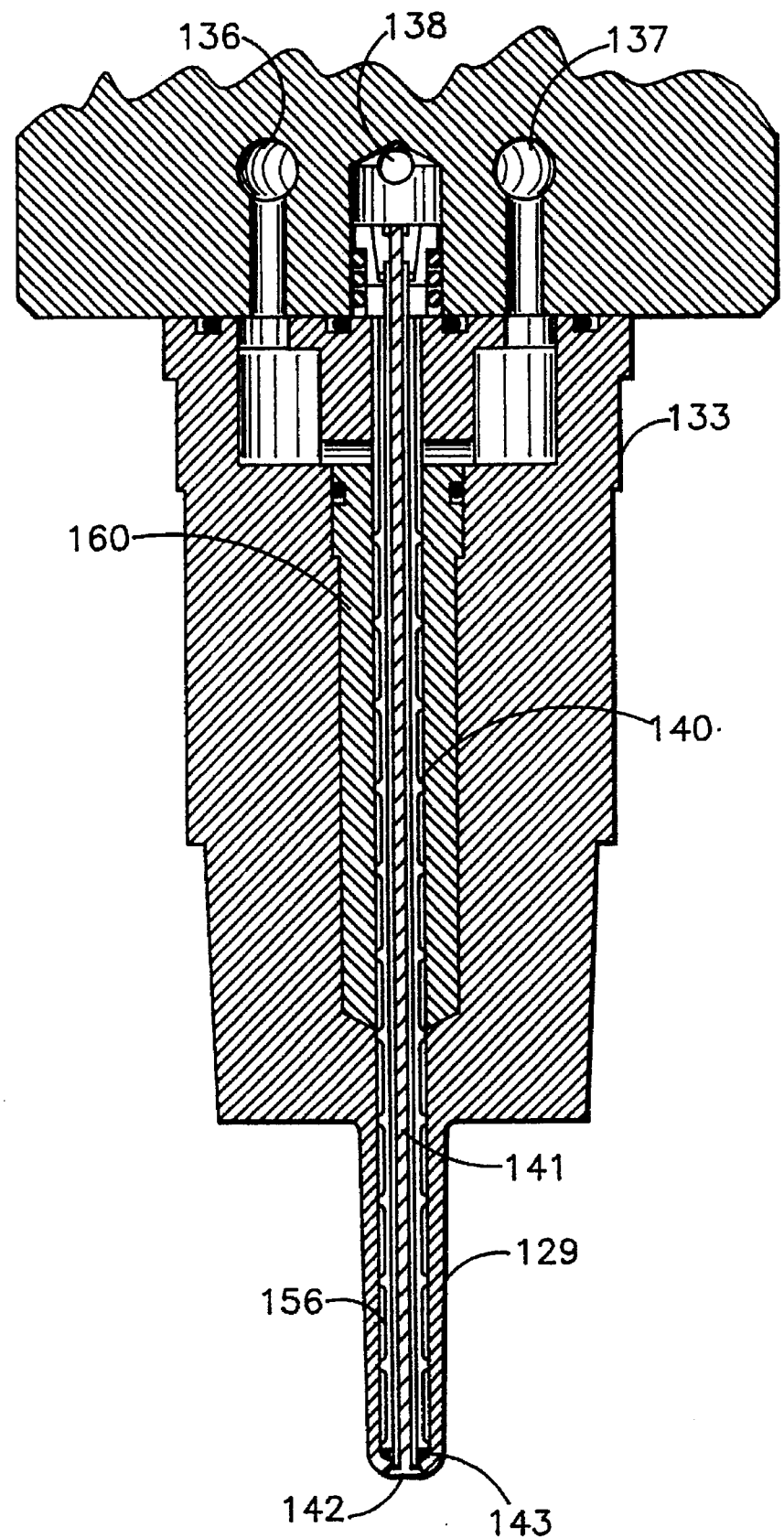
FIG. 4 is an alternative embodiment of a removable cooled core assembly including a thermally insulated portion.
Figure 5:
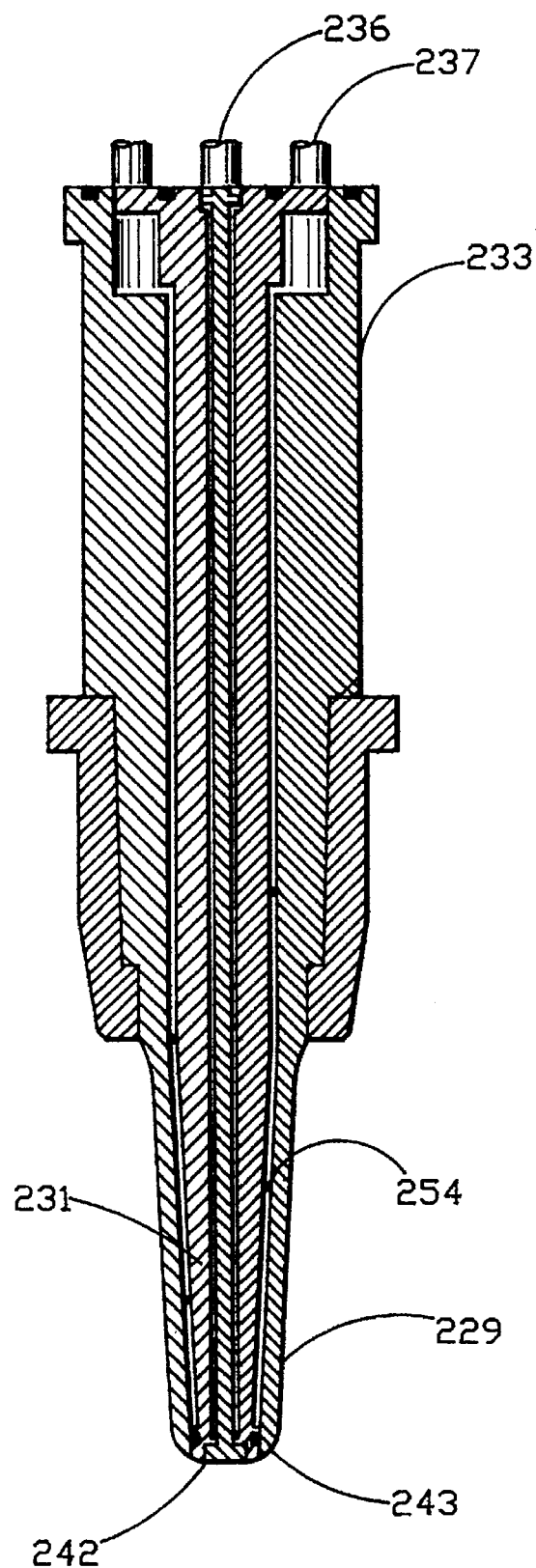
FIG. 5 is yet another embodiment of a removable cooled core having water directing elements for imparting a spiral flow path for cooling water.
Figure 6:
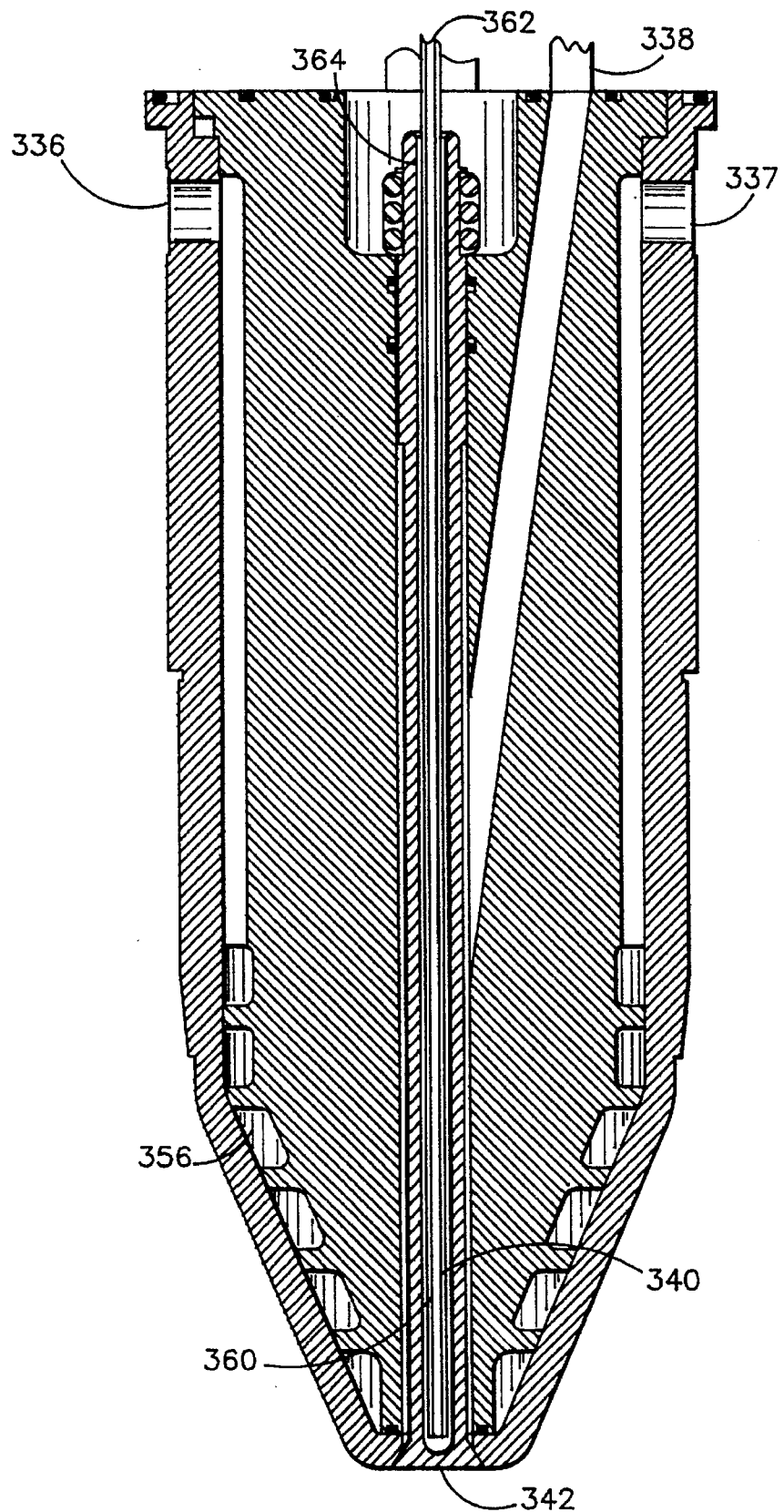
FIG. 6 is an embodiment of a cooled injection mold assembly for large containers with a centrally located secondary cooling conduit for the poppet valve.

Alternative embodiments of a removable cooled core in accordance with the present invention are illustrated in FIGS. 4, 5, and 6. As shown in FIG. 4, a removable cooled core 133 can be equipped with a conduit 156 having a double spiral outer surface which, in combination with the mold core wall 129, directs water from a water inlet 136 in a downward spiral toward a distal end of the core 133 and back upward to a water outlet 137. The lower end of conduit 156 is sealed by seal 143 and the poppet valve head 142 seals against the distal end of the core 133. Air is introduced into the interior of conduit 156 to assist in quick removal of the parison from the core 133. The inner surface of the conduit 156 includes portions in sliding engagement with the stem of the poppet valve to ensure adequate cooling of the poppet valve head and the plastic in contact therewith. Additionally, to avoid unnecessary cooling of upper portions of the core 133, an insulating portion 160 is included which surrounds the upper portion of conduit 156.

Alternatively, as shown in FIG. 5, water directing elements 254 can be positioned within a removable core 233 between the core outer wall 229 and core inner wall 231 to impart a spiral flow path to water coming into the core 233 through inlet 236 and leaving the core through outlet 237. A seal 243 seals the distal end of the core inner wall 231 to the core outer wall 229 to prevent water contact with the parison. The core inner wall 231 includes a distal end which extends to the surface of the removable core 233. The poppet valve head 242 seals against the distal end of the core inner wall 231. Air can be introduced into the interior of core inner wall 231 to assist in quick removal of the parison from the core 233. The sealing surface between the poppet valve head 242 and the core inner wall 231 provides a thermal path to ensure proper cooling of the plastic adjacent to the poppet valve heat 242.

In certain applications, the shape of the parison requires the use of a poppet valve head having a large diameter, i.e., a diameter greater than about one centimeter. In such circumstances, a poppet cooling conduit 360 can be positioned inside a poppet valve 340 as shown in FIG. 6. Water coming in through water inlet 362 passes downward toward the poppet valve head 342, cooling plastic in the region of the valve head 342. Water then returns upward along the outside of the poppet cooling conduit 360 to water outlet 364. Cooling of the bulk of the plastic is accomplished with conventional inner conduit cooling coils 356. Release of a cooled parison in a manner similar to that previously described in connection with FIGS. 3, 4 and 5 is accomplished with the aid of air directed through air inlet 338.

While the present invention has been described in connection with certain specific embodiments, it should be understood that the specific examples are not intended to limit the invention as set forth in the following claims.

The claimed invention is:

1. A removable cooled core for a plastic injection mold assembly, the removable cooled core forming at least a portion of a mold in which an article can be molded, the removable cooled core comprising an outer wall and a distal end wall defining the exterior surface of the removable cooled core, a first water channel within the core for circulating water through the core to cool hot plastic forming said article contiguous to the outer wall, a first water inlet and a first water outlet connected to the first water channel for circulating water through the first water channel, a poppet valve for controlling introduction of air between the molded article and the removable cooled core distal end wall to facilitate release of the molded article from the removable cooled core, and means for cooling the poppet valve, the cooling means comprising a poppet cooling conduit connected to a second water inlet for circulating water between the second water inlet and a second water outlet to cool plastic forming said article adjacent to the poppet valve.

2. The removable cooled core of claim 1 further comprising an inner surface of the cooled core enveloped by said outer wall, and wherein the first water channel comprises a conduit positioned within the mold core having an outer surface which, in combination with an inner surface of the mold core wall, provides a continuous fluid connection between said first water inlet and said first water outlet.

3. The removable cooled core of claim 2 wherein the conduit includes a double spiral outer surface which, in combination with the mold core wall, directs water from the first water inlet in a downward spiral toward a distal end of the core and back upward to the first water outlet.

4. The removable cooled core of claim 1 wherein the removable cooled core further includes an inner wall situated within the mold core wall, and a plurality of water directing elements situated between the inner wall and the mold core wall to impart a spiral flow pattern to water flowing between the first water inlet and the first water outlet.

5. The removable cooled core of claim 1 further comprising an inner conduit extending to an opening in the distal end wall, and wherein said poppet valve includes a stem situated within said inner conduit and a head mating with the distal end wall opening to define a valved outlet through which air can flow to facilitate separation of said molded article from the core.

6. The removable cooled core of claim 1 wherein the poppet valve has a valve head and a valve stem and wherein said poppet cooling conduit extends through the valve stem.

7. A removable cooled core for a plastic injection mold assembly, the removable cooled core forming at least a portion of a mold in which an article can be molded, the removable cooled core comprising an outer wall and a distal end wall defining the exterior surface of the removable cooled core, a first water channel within the core for circulating water through the core to cool hot plastic forming said article contiguous to the outer wall, a first water inlet and a first water outlet connected to the first water channel for circulating water through the first water channel, an inner conduit extending through the cooled core to an opening in the distal end wall, a poppet valve including a head mating with the opening in the distal end wall for controlling introduction of air between the molded article and the removable cooled core distal end wall, and means for cooling the poppet valve head, the cooling means comprising a poppet cooling conduit connected to a second water inlet for circulating water between the second water inlet and a second water outlet to cool plastic forming said article adjacent to the poppet valve head.

8. The removable cooled core of claim 7 further comprising an inner surface of the cooled core enveloped by said outer wall, and wherein the first water channel comprises a conduit positioned within the mold core having an outer surface which, in combination with an inner surface of the mold core wall, directs water from the first water inlet in a downward spiral toward a distal end of the core and back upward to the first water outlet.

9. The removable cooled core of claim 7 wherein said poppet valve includes a stem connected to said head, the stem being situated within said inner conduit, and wherein said poppet cooling conduit extends through the valve stem to the head.

10. The removable cooled core of claim 7 wherein the removable cooled core further includes an inner wall situated within the mold core wall, and a plurality of water directing elements situated between the inner wall and the mold core wall to impart a spiral flow pattern to water flowing between the first water inlet and the first water outlet.

11. A removable cooled core for a plastic injection mold assembly, the removable cooled core forming at least a portion of a mold in which an article can be molded, the removable cooled core comprising an outer wall and a distal end wall defining the exterior surface of the removable cooled core, a first water channel within the core for circulating water through the core to cool hot plastic forming said article contiguous to the outer wall, the first water channel including an inner wall situated within the mold core outer wall, and a plurality of water directing elements situated between the inner wall and the mold core wall to impart a spiral flow pattern to water flowing through the first water channel, a first water inlet and a first water outlet connected to the first water channel for circulating water through the first water channel, an inner conduit extending through the cooled core to an opening in the distal end wall, a poppet valve including a head mating with the opening in the distal end wall for controlling introduction of air between the molded article and the removable cooled core distal end wall, and a stem connected to said head, the stem being situated within said inner conduit, and means for cooling the poppet valve head, the cooling means comprising a poppet cooling conduit connected to a second water inlet for circulating water between the second water inlet and a second water outlet, the poppet cooling conduit extending through the valve stem to the head to cool plastic forming said article adjacent to the poppet valve head.

* * * * *